United States Patent [19]

Wallis

[11] 4,218,072
[45] Aug. 19, 1980

[54] VEHICLE STABILIZER

[76] Inventor: Alfred R. Wallis, P.O. Box 957, Minden, Nev. 89423

[21] Appl. No.: 933,864

[22] Filed: Aug. 15, 1978

[51] Int. Cl.$^2$ .......................................... B60G 11/00
[52] U.S. Cl. ................................. 280/689; 267/11 R
[58] Field of Search ........................ 280/689, 688, 104; 180/73 D; 267/11 R, 11 A

[56] References Cited

U.S. PATENT DOCUMENTS

| | | | |
|---|---|---|---|
| 2,094,174 | 9/1937 | Kittel | 267/11 R |
| 4,014,564 | 3/1977 | Coble | 280/689 |
| 4,079,954 | 3/1978 | Komarnicki | 280/104 |

Primary Examiner—John J. Love
Assistant Examiner—John A. Carroll

Attorney, Agent, or Firm—Warren, Chickering & Grunewald

[57] ABSTRACT

A stabilizer for a vehicle having a chassis and transversely-positioned wheel supports mounted for vertical movement relative to the chassis. The stabilizer has a pair of levers and means for pivoting these levers to the chassis about horizontally spaced longitudinal axis. The levers are formed to dispose their normally lower ends adjacent to the wheel supports. Means are provided for slidably connecting the lever ends to the wheel supports to cause conjoint vertical displacement of the lever ends and the wheel supports. The levers are formed with juxtaposed normally upper ends and means are provided for pivotal connection of the upper ends to provide conjoint vertical displacement.

12 Claims, 11 Drawing Figures

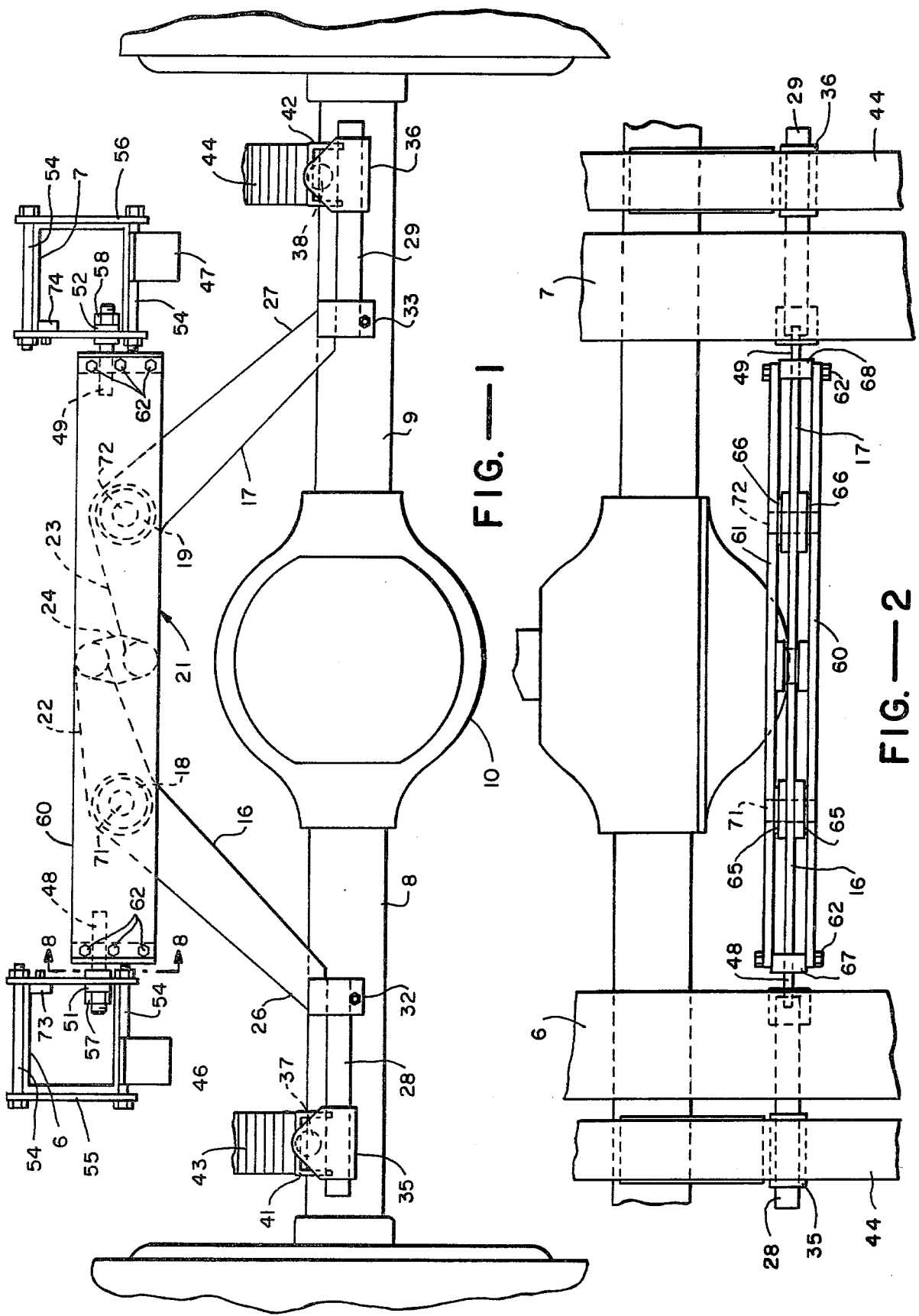

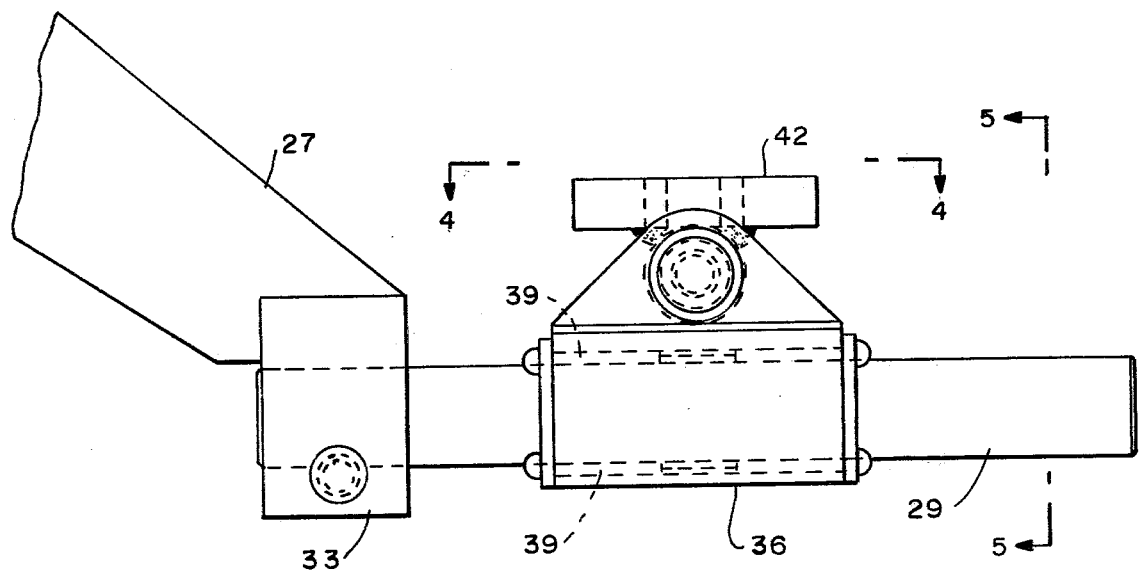
FIG.—3
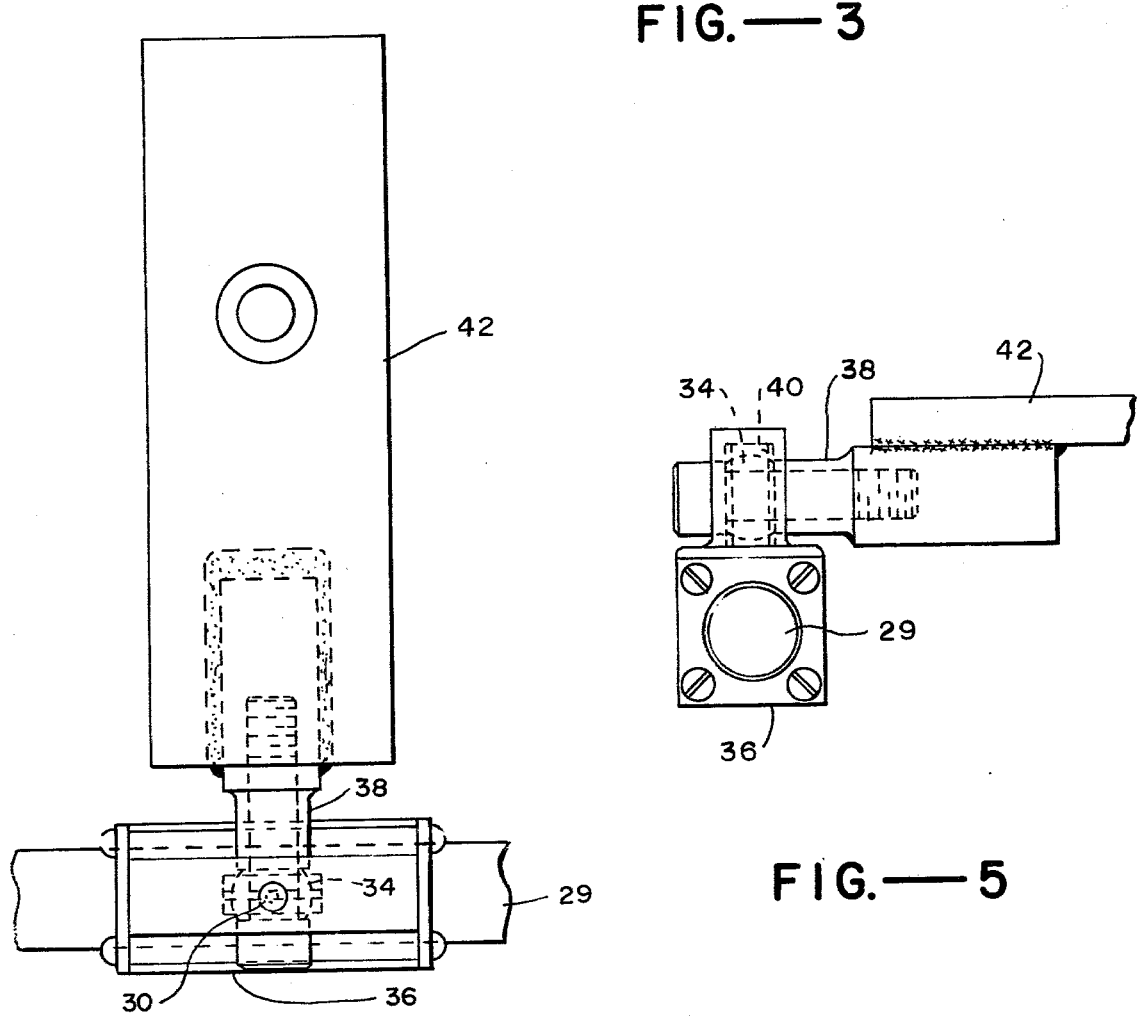
FIG.—4
FIG.—5

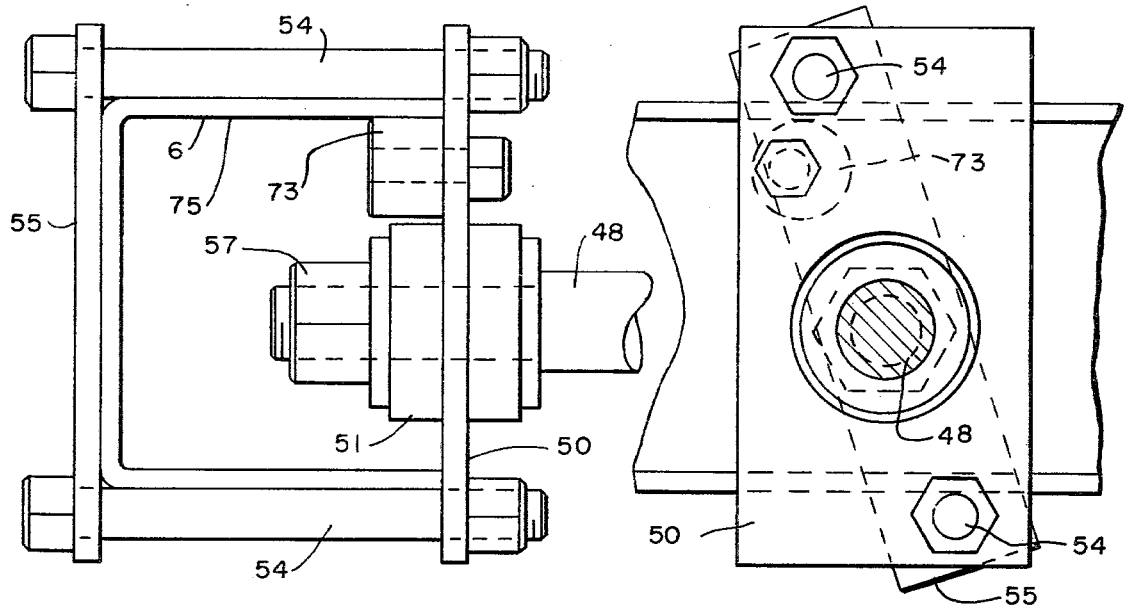
FIG.—6
FIG.—7
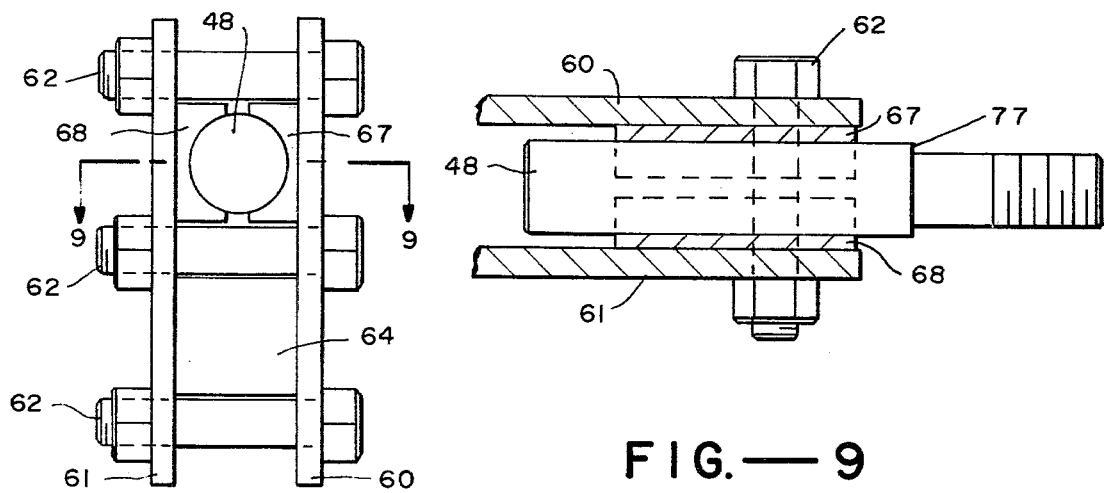
FIG.—8
FIG.—9

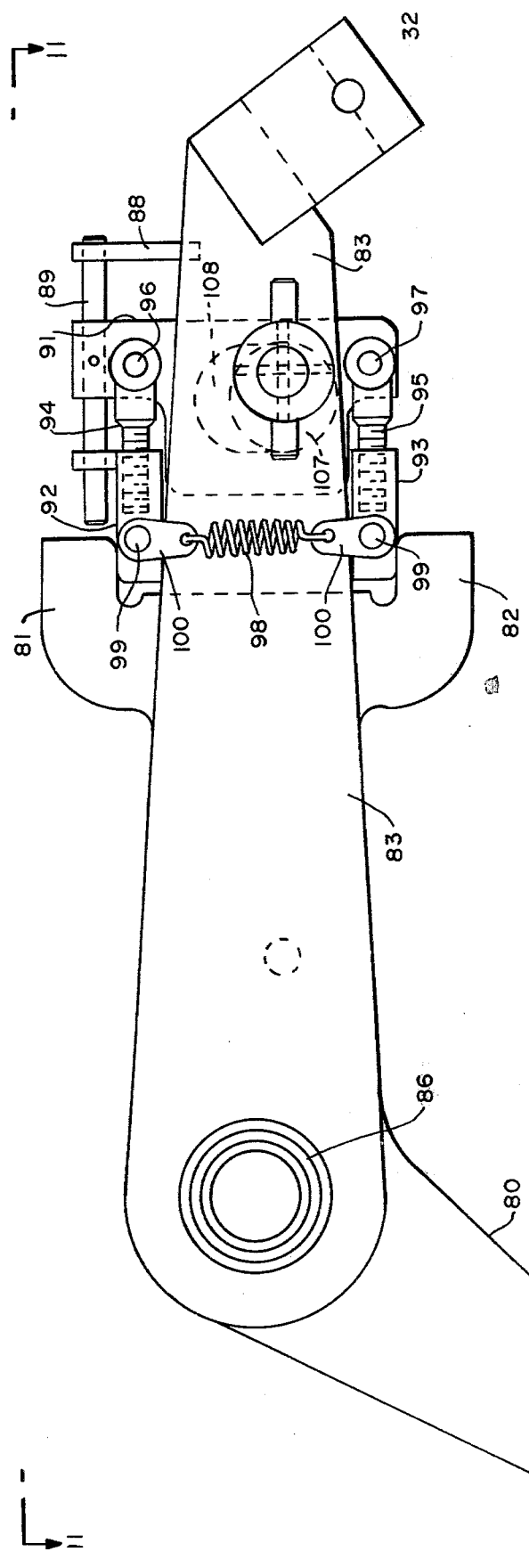
FIG.—10
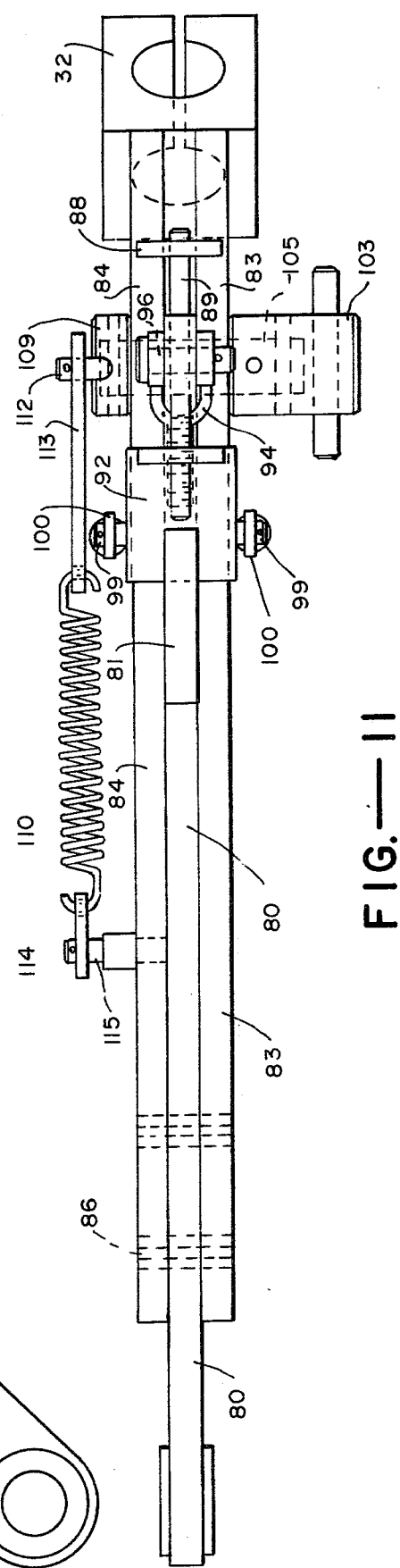
FIG.—11

VEHICLE STABILIZER

BACKGROUND OF THE INVENTION

This invention relates to vehicle suspension systems and more particularly to apparatus for stabilizing vehicular attitude.

Displacement of a vehicle body out of its normal vertical plane is a common problem and can be caused by a variety of factors. Roll, sway, lean and tilt are words used to describe the loss of parallel relation between the vehicle's body and axles. This phenomena is generally caused either by the application of unequal vertical thrusts to various wheels or by centrifical forces encountered in cornering. The effects of the aforementioned side-to-side sway of a vehicle range from passenger discomfort to dangerous loss of control. Vehicles having a high center of gravity such as pickup trucks with camper housings and so-called recreational vehicles are particularly susceptible to sway. In vehicles having standard rigid rear axle suspension systems, sway will cause a noticeable steering effect. This steering effect is caused by asymmetrical changes in the vehicular wheel base resulting from unequal distribution of loads and forces on the suspension system. This steering effect is often seen on windy days when vehicles can be seen wandering from their normally straight ahead direction of travel. This steering effect is less pronounced but nevertheless present in vehicles with independent rear suspension.

Prior art vehicle stabilization systems designed to keep the body on an even keel have, for a variety of reasons, not met with success. Some systems were too complex and for this reason could neither be economically manufactured nor adapted to a wide variety of vehicles. Other stabilization devices interfered with the normal operation of the standard vehicle suspension components. Other stabilization devices proved impractical due to excessive mechanical slack which allowed substantial vehicle tilt to develop before the stabilization device applied a corrective force.

SUMMARY OF THE INVENTION

A principal object of the invention is to provide a stabilization device for use with a vehicle suspension system which will positively control the side-to-side sway of a vehicle. The structure of the present invention provides positive roll control, thus preventing off-center positioning of the vehicle's center of gravity beyond the extent permitted by compression of the tires.

Another object is to distribute vertical forces equally to both sides of a vehicle when a vertical force is applied only to one wheel.

Another object of the present invention is to provide stabilization without adversely affecting the operation of the vehicle's spring suspension or shock absorbers.

Another feature of the present invention is that it is universal in that it can be applied to all existing vehicles, trucks, and trailers. One form of the invention will be manufactured for application as an attachment, that is, the stabilizer apparatus will be furnished in kit form to be applied to existing vehicles. On the other hand, the apparatus may be designed and installed by vehicle manufacturers as original equipment.

A further object of the present invention is to allow unimpeded vertical displacement of a vehicle axle while maintaining the axle in a plane parallel to the plane of the vehicle chassis.

Another feature of the present apparatus is that it is not limited in performing its stabilizing function with respect to the weight or load of the vehicle to which it is applied, that is, any and all weights may be carried without altering the effectiveness of stabilization.

A further object of the present invention is to maintain a stable parallel relation between the axle and chassis to which it is connected under all conditions encountered during travel.

Another object of the present invention is to convert roll energy into vertical force which is applied equally to the suspension springs causing them to be uniformly displaced as they absorb the energy imparted to them.

A still further object of the present invention is to provide a vehicle stabilizer whose operation can be selectively enabled or disabled without removing the apparatus from the vehicle.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 1 is a rear elevation of a vehicle stabilizer constructed in accordance with the present invention.

FIG. 2 is a plan view of the stabilizer.

FIG. 3 is a fragmentary rear elevation on an enlarged scale of a portion of the stabilizer.

FIG. 4 is a fragmentary plan view of the structure illustrated in FIG. 3 as taken at the position indicated by arrows 4—4 in FIG. 3.

FIG. 5 is an end elevation of the structure shown in FIG. 3 as suggested by arrows 5—5 in FIG. 3.

FIG. 6 is a fragmentary rear elevation on an enlarged scale of a portion of the apparatus illustrated in FIG. 1.

FIG. 7 is a side elevation of the structure illustrated in FIG. 6.

FIG. 8 is a fragmentary cross-sectional view on an enlarged scale taken substantially on the plane of line 8—8 of FIG. 1.

FIG. 9 is a fragmentary top plan sectional view taken substantially on the plane of line 9—9 of FIG. 8.

FIG. 10 is a rear elevation on an enlarged scale, with respect to FIG. 1, of a modified form of the stabilizer.

FIG. 11 is a top plan view of the structure illustrated in FIG. 10.

DETAILED DESCRIPTION OF THE INVENTION

A preferred embodiment of the invention is illustrated in FIG. 1 of the drawings showing a rear elevation of a typical automotive vehicle having frame members 6 and 7 and a differential and rear axle assembly 8, 9 and 10. The present invention provides a linkage between axles 8–9 and frames 6–7 so that the axle housing is constrained to move at all times parallel to the frame, i.e., remain horizontal. The linkage is preferably mounted behind the axle, see FIG. 2, so as to clear the drive line, muffler, shock asborbers and other components.

The linkage here comprises a pair of bellcrank levers 16 and 17 journalled for rotation on bearings 18 and 19 carried by a supporting structure 21 spanning frame members 6 and 7. The bellcrank levers are arranged with normally upper ends 22 and 23 in substantially vertically aligned relation and are pivotally connected by a link member 24 providing a floating pivotal connection between ends 22 and 23, thus constraining their conjoint vertical displacement and rotation about their respective bearings 18 and 19. Pins 28 and 29 are connected to the normally lower ends 26 and 27 of bellcrank levers 16 and 17 by clamps 32 and 33. Pins 28 and 29 are mounted for longitudinal reciprocation in guide members 35 and 36 which are in turn pivoted on bearing pins 37 and 38 to plates 41 and 42 which are bolted to the rear eliptical springs 43 and 44 directly behind the rear axle assembly 8, 9, 10.

As will be seen from FIG. 1, an upward movement of the left rear wheel will produce a clockwise movement of bellcrank lever 16 which is in turn transmitted as a counterclockwise movement of bellcrank lever 17, thus imparting an equal upward movement to the right rear wheel. Similarly, an upward displacement of the right rear wheel will produce a similar upward displacement of the left rear wheel. Thus, the axle and frame maintain a stable parallel relationship regardless of asymmetry in forces transmitted to the wheels by road conditions or cornering. The action of the vehicle stabilizer does not impede in any way the normal operation of the springs, shock absorbers and other suspension components. Vertical displacement of the axle assembly is not impeded so that full and complete springing of the load is unimpaired. Resilient bumpers 46 and 47 prevent direct contact between the axle assembly and the frame during periods of extreme vertical displacement.

Supporting structure 21 is fitted with shafts 48 and 49 mounted in coaxial alignment and which are journaled for rotation in bearings 51 and 52 carried by plates 50 and 53. Plates 50 and 53 are clamped to frame members 6 and 7 by bolts 54 and plates 55 and 56. Nuts 57 and 58 are here threaded on the ends of shafts 48 and 49 to retain the latter against longitudinal displacement in bearings 51 and 52.

Supporting structure 21, in FIGS. 1 and 2, is seen to comprise elongated plates 60 and 61 which are held together at their opposite ends by bolts 62, and fixed in parallel, spaced apart relation by spacers 64, 65, and 66. Pillow blocks 67 and 68 are used to clamp shafts 48 and 49 to supporting structure 21. These pillow blocks also function as spacers between plates 60 and 61. Pins 71 and 72 span and are secured to plates 60 and 61 and mounted coaxially thereon are bearings 18 and 19 and spacers 65 and 66.

Cams 73 and 74 are carried on plates 55 and 56 and function, as can be seen in FIGS. 6 and 7, to lock the plates into engagement with the frame members when the cams are rotated. Rotation of cams 73 and 74 into locking position insures that the plates 55 and 56 will not move relative to the frame members to which they are locked by the cams. The structure herein depicted is specifically designed for channel shaped vehicle frame members having open interiors for admitting the cams and shaft ends, see FIG. 6, and the cams are mounted and are movable into locking engagement with one of the frame sides 75 thus clamping it between the cam and bolt 54 which is directly above. Cam 74 is structured and functions in the same manner.

FIGS. 8 and 9 detail the connection of shaft 48 to supporting structure 21. Pillow blocks 67 and 68 here grip shaft 48, and are held in compression against the shaft by bolts 62, the latter being mounted through and clamping together plates 60 and 61. Shaft 48 does not, in the preferred form of the invention, rotate within pillow blocks 67 and 68. Shaft 48 is seen in FIG. 9 to have a shoulder 77 dimensioned for abutment against bearing 51. Shoulder 77 cofunctions with nut 57 to eliminate lateral movement of shaft 48. Shaft 49 is similarly constructed and has a shoulder which cofunctions with collar 58. By preventing lateral movement of the axially aligned shafts 48 and 49, support structure 21 will be free of lateral movement during operation of the stabilization device.

FIGS. 3, 4 and 5 detail the construction of the linkage between the lower end of each bellcrank lever and the axle assembly. Axle 9 is suspended from the vehicle chassis by a spring 44, the axle-spring connection being made by plate 42. The lower end 27 of bellcrank lever 17 is connected to plate 42 rearward of axle 9 by means of linkage detailed in FIGS. 3, 4 and 5. As will be observed from FIGS. 1 and 3, guide member 36 is formed with a cylindrical passageway, provided by bushings 39, for freely supporting for longitudinal reciprocation pin 29 mounted on the lower end 27 of the lever and having a normal horizontal extension therefrom. As an important feature of the present invention, bearing pins 38 are provided for mounting the guide members to each of the spring support plates 42 so that the lower ends of the levers may reciprocate horizontally as seen in FIGS. 1 and 3 but also at various angular positions as required in the articulation of the stabilizer structure. Importantly, also bearing pins 38 comprise a universal joint enabling fore-and-aft rocking of the guide member as well as rotation of the guide member about a longitudinal axis. As seen in FIGS. 4 and 5, spring mounting plate 42 is fitted with a rearwardly extending pin 38 providing a ball joint section 34 thereon about which is fitted a socket section 40 fixed to guide member 36. A grease fitting 30 here provides for lubricating the ball and socket joint. As wil be observed, guide members 36 are free to rotate about longitudinal axes defined by pins 38. At the same time, guide members 36 may reciprocate in a fore-and-aft direction around the ball and socket joint 34-40 thus providing a universal connection.

FIGS. 10 and 11 show a modified form of bellcrank lever which, when substituted for one of the bellcrank levers shown in FIG. 1, will provide for selective enabling and disenabling of the stabilizing apparatus. This is accomplished by forming one of the levers of a plurality of sections and providing means for selectively interlocking a section for unitary motion, or for decoupling the sections for individual articulation, thus disabling the stabilizer. The modified form of the bellcrank lever depicted in FIGS. 10 and 11 is seen to comprise a lever section 80 having ears 81 and 82 at its normally lower end and which form channel members for receiving and interlocking with slide members 92 and 93 of the other section. Outer plates 83 and 84 forming the other section are connected together at their normally lower ends where they attach to clamp 32a. At their normally upper ends, outer plates 83 and 84 are journaled for rotation on bearings 86 carried by lever section 80. Guide member 88 is connected to and spans the normally lower ends of outer plates 83 and 84. Guide member 88 has mounted, on its upper portion, guide pin 89.

Locking member 91 is positioned between the normally lower ends of plates 83 and 84 and is journaled at one end for slidable reciprocation on guide pin 89. Slide members 92 and 93 act as locking fingers and are connected to locking member 91 by shackle headed bolts 94 and 95. The U-shaped heads of bolts 94 and 95 are journaled for rotation about pins 96 and 97 which are mounted on locking member 91. Pins 99 protrude from either side of locking fingers 92 and 93. Retainer springs 98 are connected to the pivoting spring retainer tabs 100 and function to pull locking fingers 92 and 93 toward each other, thus causing the fingers to maintain constant tensioned abutment to the edges of plates 83 and 84. Locking finger 92 is dimensioned for slidable reciprocation on guide pin 89.

Handle 103 is connected to shaft 105 which extends through plate 83, locking member 91, and plate 84. Cam lobe 107 is connected to shaft 105 and is positioned between plates 83 and 84 within a semicircular cutout 108 in locking member 91. Rotation of handle 103 causes shaft 105 and its attached cam lobe 107 to rotate. As cam lobe 107 rotates, it puts pressure against the walls of semicircular cutout 108 causing locking member 91 to move along the axis of guide pin 89. Selective engagement or disengagement of the stabilizing mechanism is effected by rotation of handle 103. When handle 103 is rotated so as to insert locking fingers 92 and 93 into the channels provided by ears 81 and 82, the modified bellcrank lever operates as a rigid unitary lever. When handle 103 is rotated so as to withdraw fingers 92 and 93 from engagement with ears 81 and 82, the bellcrank lever becomes an articulated multisection assembly in which lever 80 is decoupled from locking member 91.

Collar 109 is connected to shaft 105 at the exterior side of plate 84. Pin 112 is mounted on collar 109 in an off-center position. A spring retainer 113 is mounted on pin 112 and is connected to one end of spring 110 having its opposite end connected to spring retainer 113 in turn connected to pin 115 mounted on and extending outwardly from the side of plate 84. Spring 110 exerts tension on off-center pin 112 which is converted into rotational torque on shaft 105. Pin 112 is mounted on collar 109 so that when locking fingers 92 and 93 are in overlapping engagement with ears 81 and 82 torque is exerted in the direction which will maintain contact. When handle 103 is rotated to the position which disengages the stabilizer apparatus, spring 110 exerts tension on pin 112 which prevents accidental re-engagement. Spring 110 and pin 112 serve therefore to afford two stable positions of handle 103, one corresponding to full engagement of the stabilizer and the other corresponding to full disengagement.

What is claimed is:

1. A stabilizer for a vehicle having a chassis and transversely-positioned wheel supports mounted for vertical movement relative to said chassis comprising:
   a pair of levers;
   means for pivoting said levers intermediate their ends to said chassis about horizontally spaced longitudinal extending axes;
   said levers being formed to dispose normally lower ends adjacent said wheel supports;
   means slidably connecting said lever ends to said wheel supports causing conjoint vertical displacement of said lever ends and said wheel supports and including first guide members and pivotal means for mounting said first guide members one to each of said wheel supports for rotation about a longitudinal axis, and second guide members mounted one on each lever end and mounted in slidable embrace with said first guide members;
   said levers being formed to provide juxtaposed normally upper ends; and
   means formed for pivotal connection of said upper ends to provide conjoint vertical displacement thereof.

2. The structure of claim 1, said pivotal means for each of said first guide members comprising a universal joint.

3. The structure of claim 1,
   one of said guide members having a substantially horizontally disposed transversely extending track and the other of said guide members having an elongated part mounted in slidable engagement with said track; and
   each said track and engaged part extending substantially perpendicular to a radius therefrom to said last-named associated axis.

4. The structure of claim 3, said pivotal means for each of said first guide members comprising a universal joint.

5. The structure of claim 1, said first-named means comprising:
   a supporting member and pivotal means for mounting said support member to said chassis for rotation about an axis extending longitudinally of said support member and with said support member extending substantially horizontally transversely of said chassis in superimposed relation to said wheel supports; and
   said first-named pivoting means connecting said levers to said support member.

6. The structure of claim 5, said upper lever ends being mounted in substantially vertically aligned relation; and
   a link member pivoted to said lever ends and providing a floating pivotal connection therebetween.

7. The structure of claim 5 for vehicles having longitudinally extending frame members adjacent opposite sides of said chassis;
   a pair of clamps adapted for attachment to said frame members; and
   said pivotal means for said support member comprising bearings and shafts mounted on said support member and clamps.

8. The structure of claim 7, each of said clamps comprising a plate confronting the opposite ends of said support member;
   said bearings being mounted one on each of said plates; and
   said shafts being mounted in coaxial alignment at and projecting from said opposite ends of said support member for journaling in said bearings.

9. The structure of claim 8 for channel-shaped vehicle frame members having an open interior and opposed sides; and
   a cam carried by said plates and movable into locking engagement with one of said sides.

10. The structure of claim 1, one of said levers comprising a plurality of sections; and
    means selectively interlocking said sections for unitary motion and for decoupling said sections for individual articulation disabling said stabilizer.

11. The structure of claim 10, said sections being pivotally connected;

one of said sections providing said normally lower lever end;

the other of said sections providing said normally upper lever end; and said selective locking means functioning to prevent and permit relative movement of said sections about their pivotal connections in the locked and decoupled positions of said sections respectively.

12. The structure of claim 11, said sections having portions substantially aligned in the relatively unloaded attitude of said vehicle; and said selective locking means comprising:
- a slide member mounted for reciprocation on one of said portions;
- a channel member mounted on the other of said portions in position to receive said slide member; and
- manually actuated means for displacing said slide member into and out of engagement with said channel member.

* * * * *